(12) United States Patent
Uchida

(10) Patent No.: US 6,845,319 B2
(45) Date of Patent: Jan. 18, 2005

(54) NAVIGATION APPARATUS, METHOD AND PROGRAM FOR UPDATING FACILITY INFORMATION AND RECORDING MEDIUM STORING THE PROGRAM

(75) Inventor: Takayuki Uchida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/419,207

(22) Filed: Apr. 21, 2003

(65) Prior Publication Data
US 2003/0204308 A1 Oct. 30, 2003

(30) Foreign Application Priority Data
Apr. 26, 2002 (JP) ...................................... 2002-127402

(51) Int. Cl.$^7$ .............................................. G01C 21/30
(52) U.S. Cl. ................. 701/208; 701/200; 340/995.14; 340/995.18
(58) Field of Search ................................ 701/200, 207, 701/208; 340/995.1, 995.14, 995.16, 995.18

(56) References Cited

U.S. PATENT DOCUMENTS

| | | | | |
|---|---|---|---|---|
| 4,954,959 A | * | 9/1990 | Moroto et al. ............... | 701/211 |
| 5,067,081 A | * | 11/1991 | Person ........................ | 701/202 |
| 6,075,467 A | * | 6/2000 | Ninagawa .............. | 340/995.14 |
| 6,230,098 B1 | * | 5/2001 | Ando et al. ................. | 701/208 |
| 6,453,233 B1 | * | 9/2002 | Kato ........................... | 701/208 |
| 6,519,526 B1 | * | 2/2003 | Adachi et al. .............. | 701/208 |
| 6,549,847 B2 | * | 4/2003 | Ikeuchi et al. .............. | 701/208 |
| 6,636,799 B2 | * | 10/2003 | Jambhekar et al. ......... | 701/200 |
| 6,704,649 B2 | * | 3/2004 | Miyahara ..................... | 701/208 |
| 6,728,633 B2 | * | 4/2004 | Mikuriya et al. ........... | 701/208 |
| 2003/0004637 A1 | * | 1/2003 | Adachi ....................... | 701/207 |

FOREIGN PATENT DOCUMENTS

| | | |
|---|---|---|
| DE | 197 46 597 | 4/1999 |
| EP | 0 330 787 | 9/1989 |
| EP | 0 767 358 | 4/1997 |

OTHER PUBLICATIONS

European Search Report dated Nov. 20, 2003.

* cited by examiner

*Primary Examiner*—Gary Chin
(74) *Attorney, Agent, or Firm*—Armstrong, Kratz, Quintos, Hanson & Brooks, LLP

(57) ABSTRACT

Of the pieces of facility information of the map information stored in map information storage section 6, those that need to be altered are stored in editing information storage section 10. Each piece of positional information on a facility in the updating information relating to the facility and specifically describing alterations is linked to a piece of pre-edition information and stored in the editing information storage section 10 as post-edition information to generate a pair of pieces of editing information. As a destination is selected and input at operation section 7, the editing information is retrieved and a piece of pre-edition information or post-edition information containing positional information same as that of the destination is detected. The pre-edition information is replaced by the updating information of the detected post-edition information of the editing information to define the destination and the route of movement. Thus, if the map information is unwritable, alterations to the map information can be made to it by means of editing information so that the user can be provided with appropriate guidance. Thus, the cost of revising the map information can be significantly reduced.

10 Claims, 6 Drawing Sheets

NAVIGATION APPARATUS, METHOD AND PROGRAM FOR UPDATING FACILITY INFORMATION AND RECORDING MEDIUM STORING THE PROGRAM

BACKGROUND OF THE INVENTION

1. Field of the Invention

This invention relates to a navigation apparatus, a method and a program for updating facility information and a recording medium storing the program.

2. Description of Related Art

Navigation apparatus for supporting the user driving a motor vehicle by providing guidance for the moving vehicle until the vehicle gets to the destination have been developed in recent years and are well known at present. Such a navigation apparatus automatically retrieves information on the destination facilities of the driver and the passengers of the vehicle, which may include a store, a public facility, a facility at a scenic spot or a spot of historic interest and/or a facility at a tourism spot, as part of map information when cue information on the destination facilities is selected and input to the navigation apparatus. As one of the retrieved facilities is selected, the route of movement of the vehicle from the current position to the destination, which is the selected facility, is defined on the basis of the road information contained in the map information. As the vehicle is driven to move along the defined route of movement, the driver is guided by voice and display so as to move along the defined route depending on the moving condition of the vehicle.

With conventional navigation apparatus, map information is typically stored on a recording medium such as CD-ROM (compact disk-read only memory) or DVD-ROM (digital versatile disk-read only memory). The stored map information is read and retrieved by means of a memory disk drive. Then, the retrieved information is processed for use. Meanwhile, stores and facilities at tourist spots can be moved frequently. Therefore, for the driver to utilize map information for the purpose of driving the vehicle by retrieving information on the destination facilities and the routes of movement to be followed in order to get to them, the map information should be updated to accommodate the positional changes of facilities that have taken place in order for the driver to effectively search and retrieve necessary information. Therefore, recording mediums storing updated map information are marketed every year.

However, with the conventional practice of providing updated recording mediums every year, the user needs to buy a new recording medium and the cost of buying such a new recording medium every year will be costly to the user.

SUMMARY OF THE INVENTION

In view of the above identified circumstances, it is therefore the object of the present invention to provide a navigation apparatus, a method and a program for updating facility information and a recording medium storing the program that can reduce the cost of updating the map information for the user.

According to the invention, the above object is achieved by providing a navigation apparatus comprising: a map information storage section for storing map information including facility information containing positional information on facilities and identifying information for identifying each of the facilities, an input section for selecting and inputting updating information for updating the facility information in the map information;

an editing information storage section for storing editing information linking the updating information to the facility information in the map information; and facility information collating section for performing a control operation of causing the editing information storage section to store the updating information by recognizing the updating information as selected and input by the input section and causing the updating information to be read on the basis of the editing information by recognizing a request for reading the facility information in the map information.

Thus, according to the invention, the facility information collating section recognizes the updating information for updating the facility information in the map information as selected and input by the input section. Then, it links the updating information to the facility information in the map information and stores the updating information in the editing information storage section, while, at the same time, it recognizes the request for reading the facility information in the map information and actually reads the updating information linked to the facility information according to the request on the basis of the editing information stored in the editing information storage section. As a result, editing information is generated by linking updating information to the facility information that needs to be altered so that the user can utilize the alteration that is made to the facility information without revising the map information. Thus, the user can acquire facility information on the basis of the map information and the editing information. Therefore, if the map information storage section is an unwritable memory section such as CD-ROM or a DVD-ROM and the facility information in the map information needs to be altered because the state of a facility such as a store has been changed, the updated facility information can be utilized as if a revised map information is at hand and available.

Positional information for describing facilities contained in the facility information may be the latitude and the longitude of the location of each of the facilities, which may typically be well known sites, well known buildings, stores, facilities, scenic spots, spots of historic interest and tourism spots. Icons and marks may be used as information for identifying the facilities contained in the facility information. Facilities that are described in the facility information may typically include well known sites, well known buildings, stores, facilities, scenic spots, spots of historic interest and tourism spots because they can often be used as objects to be detected for drivers driving vehicles.

In a navigation apparatus according to the invention, the editing information storage section preferably stores editing information as pieces of information, each of which is constituted by a pair of pieces of information including a piece of post-edition information that is updating information and a piece of pre-edition information that is a piece of facility information to which the updating information is linked.

According to the invention, the editing information storage section stores pieces of editing information, each of which is constituted by a pair of pieces of information including a piece of pre-edition information that is facility information in the map information and a piece of post-edition information that is updating information linked to the pre-edition information. Then, pieces of editing information including pairs of pieces of pre-edition information and pieces of post-edition information are stored in a table structure, where each pair of a piece of pre-edition information and a piece of post-edition information is stored as record. Therefore, altered facility information can be utilized without revising the map information by means of a simple arrangement of using a piece of updating information to replace a piece of pre-edition information linked to it.

In a navigation apparatus according to the invention, preferably the editing information storage section links a piece of positional information relating to the facility contained in the updating information to the facility information having a same positional information and contained in the map information and stores it as editing information.

According to the invention, preferably the editing information storage section stores a piece of facility information contained in the map information and a piece of updating information having same positional information by linking them to each other. Then, the facility information to be altered is replaced by a piece of updating information on the basis of positional information. Thus, the altering operation and the operation of linking pieces of information can be performed in an easy manner so that the facility information in the map information can be altered in an efficient way.

In a navigation apparatus according to the invention, preferably the editing information storage section can store a blank data that represents a no data condition indicating that the facility that corresponds either to a piece of facility information in the map information or to a piece of related updating information does not exist any more and the facility information collating section recognizes that a piece of facility information is added or deleted when a blank data is detected.

Thus, according to the invention, the editing information storage section can store a blank data that represents a no data condition indicating that the facility that corresponds either to a piece of facility information in the map information or to a piece of related updating information does not exist any more. Then, when the facility information collating section detects a blank data, it is judged that a piece of facility information is newly added to the map information or a piece of facility information is deleted from the map information. With this arrangement, when a piece of facility information is a blank data, the updating information linked to it is dealt as newly added piece of information and, when the updating information linked to a piece of facility information is a blank data, the facility described in the map information is dealt as non-existent facility so that the facility information in the map information can be altered to a large extent to raise the operational flexibility of the navigation apparatus.

According to the invention, there is also provided a method for updating the information relating to the facilities described in the map information to be utilized by a navigation apparatus for a moving vehicle, the method comprising: storing selected and input updating information for updating a piece of facility information including positional information relating to a facility contained in the map information and identifying information for identifying the facility upon recognizing the input of the updating information; and acquiring the updating information on the basis of the stored editing information at the time of acquiring the piece of facility information in the map information.

A method according to the invention is developed as method for updating facility information relating to the facilities in the map information to be utilized by a navigation apparatus for a moving vehicle. Therefore, it provides advantages similar to those of a navigation apparatus according to the invention.

Since a method for updating facility information according to the invention is designed on the basis of a concept similar to the design concept of a navigation apparatus according to the invention, it provides advantages similar to those of the navigation apparatus.

According to the invention, there is also provided a program for updating facility information relating to the facilities in the map information to be utilized by a navigation apparatus for a moving vehicle, which program is to be executed by a computational section.

According to the invention, a general purpose computer may be installed and used as computational section. Then, a method for updating facility information for a navigation apparatus can be executed by the computational section to promote the use of a navigation apparatus according to the invention.

A recording medium according to the invention stores a program for updating facility information for a navigation apparatus so as to be read by a computational section.

Since a program for updating facility information that is designed to carry out a method for updating facility information for a navigation apparatus according to the invention is stored in a recording medium, the program for updating facility information for a navigation apparatus can be handled with ease to promote the use of a navigation apparatus according to the invention.

With regard to a program and a recording medium according to the invention, the computational section may be a personal computer or a combination of a plurality of computers that are combined to form a network, an element such as an IC or a CPU that may be a microcomputer or a circuit substrate carrying a plurality of electric parts.

DETAILED DESCRIPTION OF THE PREFERRED EMBODIMENTS

Now, the present invention will be described by referring to the accompanying drawings that illustrate a preferred embodiment of the invention.

[Configuration of Navigation Apparatus]

Figure 1:
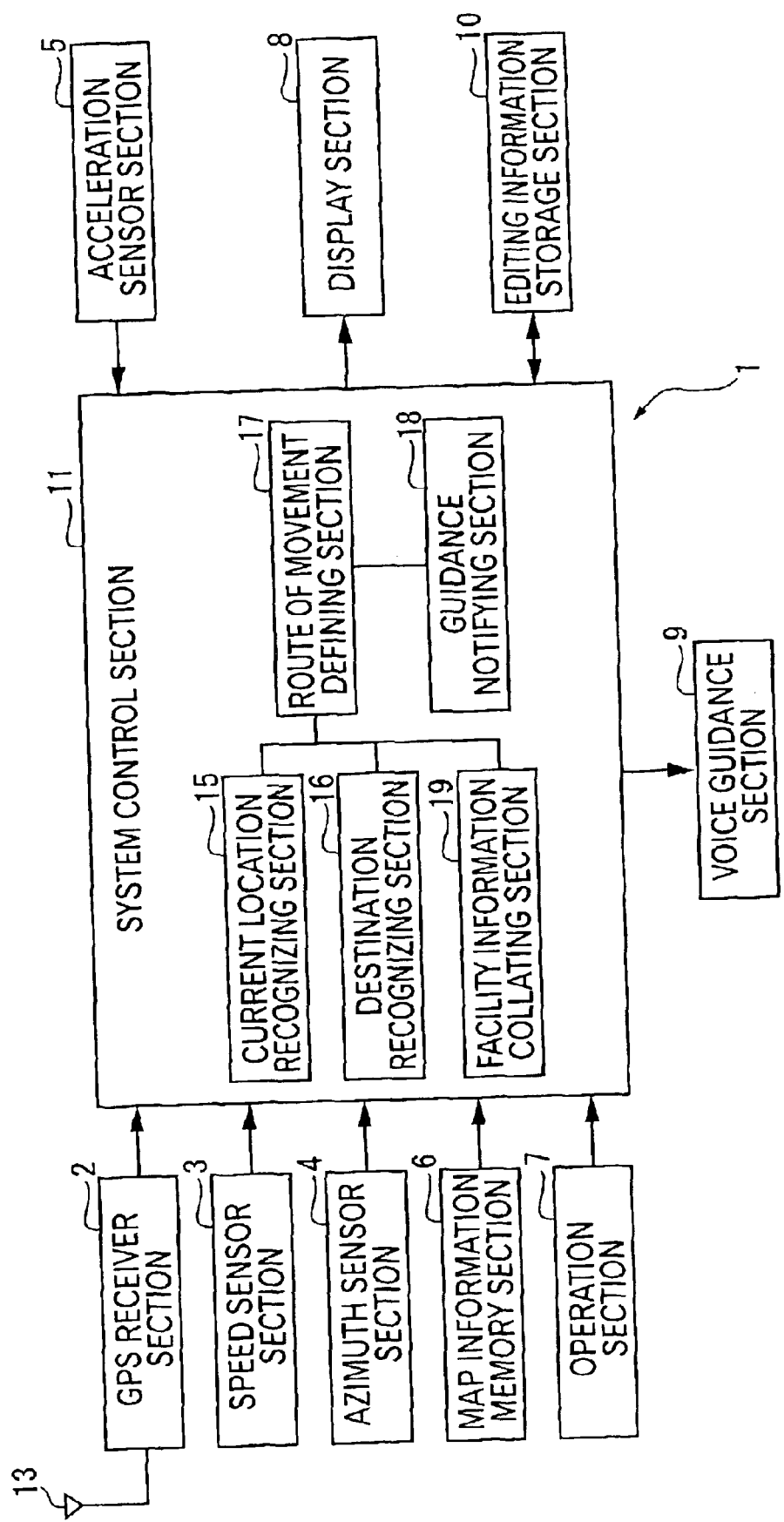
FIG. 1 is a schematic block diagram of an embodiment of navigation apparatus according to the invention, schematically illustrating its configuration.
Figure 2:
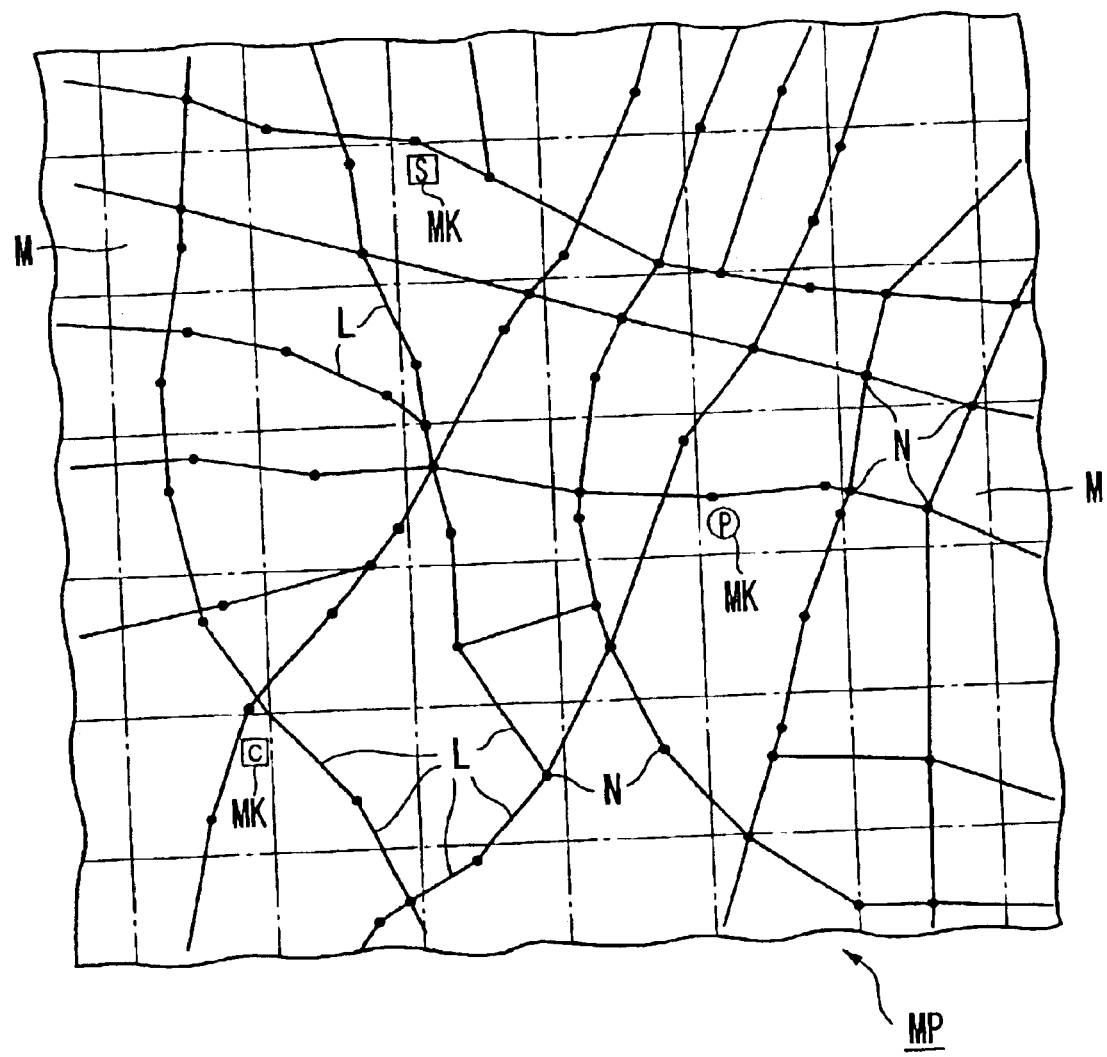
FIG. 2 is a schematic illustration of map information that may be stored in the embodiment of FIG. 1.
Figure 3:
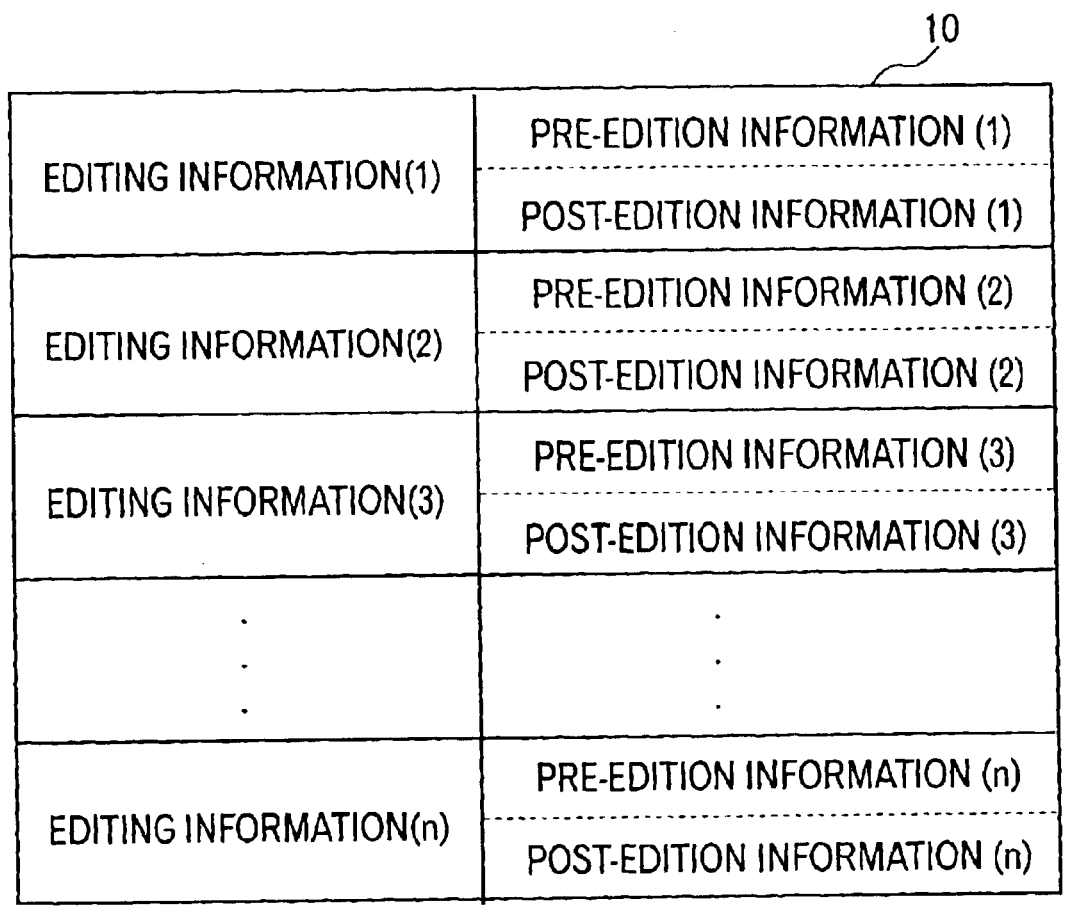
FIG. 3 is a schematic conceptual illustration of a table stored in the editing information storage section of the embodiment of FIG. 1, illustrating the structure thereof.

FIG. 1 is a schematic block diagram of the embodiment of navigation apparatus according to the invention, schematically illustrating its configuration. FIG. 2 is a schematic illustration of road map that may be stored in the embodiment. FIG. 3 is a schematic conceptual illustration of a table stored in the editing information storage section of the embodiment, illustrating the structure thereof.

Reference symbol 1 in FIG. 1 denotes a navigation apparatus according to the invention, which may be arranged in a vehicle that may typically be a sedan. The navigation apparatus 1 is driven to operate as it is powered by a battery mounted in the vehicle.

The navigation apparatus 1 comprises a GPS (global positioning system) receiver section 2, a speed sensor section 3, an azimuth sensor section 4, an acceleration sensor section 5, a map information memory section 6 operating as map information storage section, an operation section 7 operating as input section, a display section 8, a voice guidance section 9, an editing information storage section 10 and a system control section 11.

A GPS antenna 13 is connected to the GPS receiver section 2. The GPS receiver section 2 receives a navigation radio wave output from a GPS satellite (not shown), which is an artificial satellite, by way of the GPS antenna 13. Then, the GPS receiver section 2 computationally determines the pseudo-coordinate values of the current location on the basis of the received signal and outputs the determined pseudo-coordinate values to the system control section 11 as GPS data.

The speed sensor section 3 is arranged in the vehicle to detect the running speed of the vehicle. Then, the speed sensor section 3 reads the pulse signal or the voltage value output according to the revolutions per unit time of the axles or the wheels. Then, it converts the detected signal into a speed data or an actual acceleration data in the form of a pulse or a voltage and outputs the data to the system control section 11.

The azimuth sensor section 4 is also arranged in the vehicle and has a so-called gyro-sensor. Thus, it detects the azimuth of the vehicle or the running direction in which the vehicle proceeds. Then, the azimuth sensor section 4 converts the detected running direction of the vehicle into an azimuth data typically in the form of a pulse or voltage and outputs it to the system control section 11.

The acceleration sensor section 5 is also arranged in the vehicle and compares, for instance, the gravity acceleration and the acceleration produced by the running movement of the vehicle to detect the moving condition of the vehicle in the vertical direction. Then, the acceleration sensor section 5 converts the detected running condition of the vehicle into an acceleration data typically in the form of a pulse or voltage and outputs it to the system control section 11.

The map information memory section 6, or map information storage section, readably stores map information on road maps and other additional information necessary for guiding the running vehicle, which will be described hereinafter. For instance, it has a drive unit for reading map information and additional information stored in an optical or magnetic disc, which may be a DVD-ROM (digital versatile disc—read only memory) or hard disc. Then, the map information memory section 6 appropriately outputs the map information and/or the additional information it reads to the system control section 11.

Map information that can be stored in the map information memory section 6 typically has a data structure as shown in FIG. 2. Referring to FIG. 2, the map information MP includes a plurality of pieces of mesh information M to which specific respective numbers are assigned and annexed. The pieces of mesh information M include the defined length of each side that is obtained by reduction to reflect the reduced scale of the map relative to the actual ground. Thus, the map information MP is obtained by longitudinally and transversally connecting the pieces of mesh information M.

In the map information MP, roads are segmented and each segment of road is expressed by a pair of nodes N (a pair of black dots in FIG. 2) and a line, or a link L, connecting the nodes N. Thus, road information is prepared by using nodes N and links L. Each node N may indicate a crossing of roads, a bending point of a road, a fork or a junction. The information on each node N includes information on the location of the node N expressed in terms of, for example, latitude and longitude, the specific number annexed to the node N and fork information telling if the node N is a crossing or a fork location where a number of links meet or not. The information on each link L includes the specific number annexed to the link L and node information on the nodes N linked by the link L including the specific numbers annexed to the respective nodes N.

The map information MP also includes marks MK assigned respectively to well known sites, well known buildings, stores, facilities, scenic spots, spots of historic interest and tourism spots and facility information on the locations of the facilities expressed in terms of, for example, latitude and longitude. Facilities that may be described in the facility information include so-called well known sites such as stores including restaurants and gas stations as well as other buildings that may be selected as destinations and whose information may be retrieved. The map information MP includes road information on the number of lanes correlated with each link L as characteristics of road such as the number of lanes, the existence or non-existence of a median strip, the width and so on and also denomination information such as the denomination of each crossing.

The operation section 7 operates as input section and has various operation buttons (not shown) for appropriately operating the navigation apparatus 1 including one for issuing a command for displaying the moving condition, or the running condition, of the vehicle. As any of the operation buttons is operated to input a data or command, the operation section 7 outputs a corresponding signal to the system control section 11 to specify an operation to be performed. Operations that can be selected by using the buttons include one for specifying a specific operation of the navigation apparatus 1, one for specifying the destination of the vehicle, one for adding new facility information to or altering the facility information in the map information to be displayed on the display section 8 and one for specifying a specific item to be added or altered. The operation buttons of the operation section 7 may be replaced by a touch panel that may be arranged in the display section 8 or a voice input device by which a command may be input as voice command.

The display section 8 appropriately displays the map information MP and/or the additional information output from the map information memory section 6, the TV image data received by means of a TV receiving set (not shown) and the image data stored in the recording medium such as an optical disc or magnetic disc and read by the drive unit. More specifically, the display section 8 may be realized by using liquid crystal, organic EL (electroluminescence), a PDP (plasma display panel) or a CRT (cathode ray tube).

The voice guidance section 9 has a voicing section such as a loudspeaker (not shown). The voice guidance section 9 notifies the driver and other persons in the moving vehicle of various pieces of information necessary for guiding the moving vehicle such as the running direction and the running condition of the vehicle by voice output from the voicing section. The voicing section may appropriately output the TV voice data received by means of the TV receiving set or some of the voice data recorded in the optical or magnetic disc.

The editing information storage section 10 has a table structure for storing a plurality of pieces of editing information n, each of which is constituted by a pair of pieces of information including a piece of facility information (pre-edition information n) relating to a facility that is found in the map information MP stored in the map information storage section 6, including positional information on the location of the facility and a corresponding piece of facility information (post-edition information n) which is the updating information input at the operation section 7 as shown in FIG. 3. The editing information storage section 10 stores the facility information and the updating information output from the system control section 11 and outputs the information it stores to the system control section 11.

The system control section 11 has various input/output ports (not shown) such as a GPS reception port connected to the GPS receiver section 2, a key input port connected to the operation section 7, a display control port connected to the display section 8 and a voice control port connected to the voice guidance section 9. The system control section 11 also operates as moving condition recognizing section that recognizes the running condition of the vehicle on the basis of the signals from the sensor sections 3 through 5. In other words, it computes the running speed and the running direction of the vehicle, the distance covered by the vehicle and so on.

The system control section 11 is provided with current location recognizing section 15, destination recognizing section 16, route of movement defining section 17, guidance notifying section 18 and facility information collating section 19.

The current location recognizing section 15 computationally determines a plurality of current pseudo-locations of the vehicle on the basis of the speed data and the azimuth data output respectively from the speed sensor section 3 and the azimuth sensor section 4. Additionally, the current location recognizing section 15 recognizes the current pseudo-coordinate values of the vehicle on the basis of the GPS data for the current location output from the GPS receiver section 2. Then, the current location recognizing section 15 recognizes the current location of the vehicle by comparing the computationally determined current pseudo-locations and the recognized current pseudo-coordinate values and computationally determining the current location of the vehicle to be displayed on the map information that is displayed in the display section 8.

Additionally, the current location recognizing section 15 recognizes the current location of the vehicle by judging the inclination and the difference of height of the road on which the vehicle is running on the basis of the acceleration data of the vehicle output from the acceleration sensor section 5 and computationally determining the current pseudo-locations of the vehicle. Thus, it can accurately recognize the current location of the vehicle if the vehicle needs to be located vertically on a spot in a map because it is on a multi-level crossing or flyover roadway. When the vehicle is running on a mountain road or slope, it can accurately recognize the current location of the vehicle by correcting the error produced by the difference between the moving distance obtained theoretically from speed data and azimuth data and the distance actually covered by the vehicle by using the detected inclination of the road.

Furthermore, the current location recognizing section 15 computationally determines the running speed and the running direction of the vehicle and obtains information on the distance covered by the vehicle on the basis of speed data, azimuth data and acceleration data. The current location recognizing section 15 can also recognize the starting point specified and input at the operation section 7 as starting point as pseudo-current location in addition to the above described current location of the vehicle.

The various pieces of information obtained by the current location recognizing section 15 are then stored in memory section (not shown) such as RAM (random access memory) arranged in the system control section 11. However, it should be noted that the memory section may alternatively be arranged outside the system control section 11 instead of being arranged in the system control section 11 if the memory section can exchange information with the system control section 11. More specifically, it may be arranged in a data base connected to the system control section 11 or in a server that is connected to the system control section 11 by way of communication section so as to be able to exchange information with the system control section 11 by way of a wireless medium.

The destination recognizing section 16 acquires destination information relating to the destination specified and input as a result of an input operation at the operation section 7 and recognizes the location of the destination. Information that can be utilized to specify and input the destination include coordinate values such as latitude and longitude, an address, a telephone number and other pieces of information that can be used for specifying a location. The information on the destination recognized by the destination recognizing section 16 is stored in the memory section. Additionally, the destination recognizing section 16 acquires facility information in the map information MP stored in the map information storage section 16 and facility information in the updating information stored in the editing information storage section 10 as destination information.

The route of movement defining section 17 defines the route of movement from the current location of the vehicle recognized by the current location recognizing section 15 or the current pseudo-location such as the starting point specified and input at the operation section 7 and the destination recognized by the destination recognizing section 16. More specifically, the route of movement is typically defined by searching for the roads through which a vehicle can move on the basis of the map information MP and the additional information acquired from the map information memory section 6 and selecting a route that provides the shortest moving distance or a route that can avoid traffic jams and traffic restrictions. The defined route of movement is stored in the memory section. It is also displayed appropriately on the display section 8 in response to an input operation at the operation section 7.

The guidance notifying section 18 provides the vehicle driver with guidance for driving the vehicle typically stored in the memory section so as to correspond to the running condition of the vehicle and support the driver. The guidance may be provided in the form of voice emitted from the voice guidance section 9 and/or an image displayed on the display section 8. The guidance that is output in voice may be "Please follow the right way toward ΔΔ at the fork ∘∘ 700 m ahead", "You diverted from the route of movement" or "You have a traffic jam ahead."

The facility information collating section 19 collates a piece of facility information in the map information MP stored in the map information storage section 6 and a corresponding piece of updating information for that piece of facility information including positional information on the location of each facility and stores the pair of pieces of information in the editing information storage section 10.

More specifically, the facility information collating section 19 detects facility information in the map information MP on the basis of the positional information on the location of the facility selected and input as updating information at the operation section 7. When the facility information collating section 19 recognizes the positional information in the facility information in the map information MP for the same location, it links the facility information in the map information and the facility information input as updating information.

If, on the other hand, the facility information collating section cannot recognize the positional information in the facility information in the map information MP because it cannot detect the positional information, it recognizes "blank" as facility information and links "blank" and the facility information input as updating information. Additionally, if the facility described in the facility information in the map information does not exist any more because it has been moved, it also links the facility information with "blank" which is input as updating information.

The facility information collating section 19 then operates for storing the facility information input and linked as updating information and the facility information in the map information MP as pair of pieces of editing information in the table structure of the editing information storage section 10.

[Operation of Navigation Apparatus]

Figure 4:
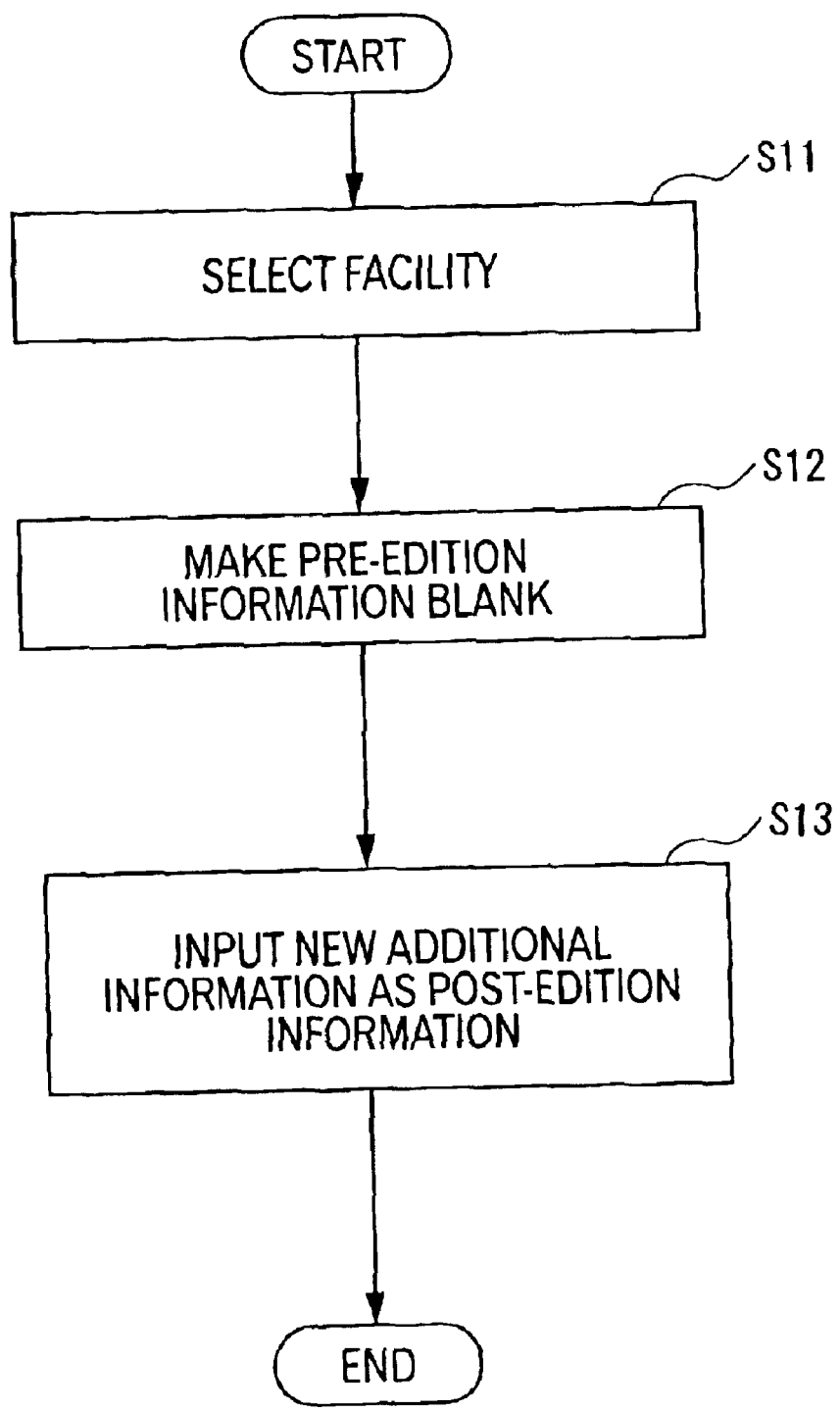
FIG. 4 is a flow chart of the operation of adding new facility information of the embodiment of FIG. 1.
Figure 5:
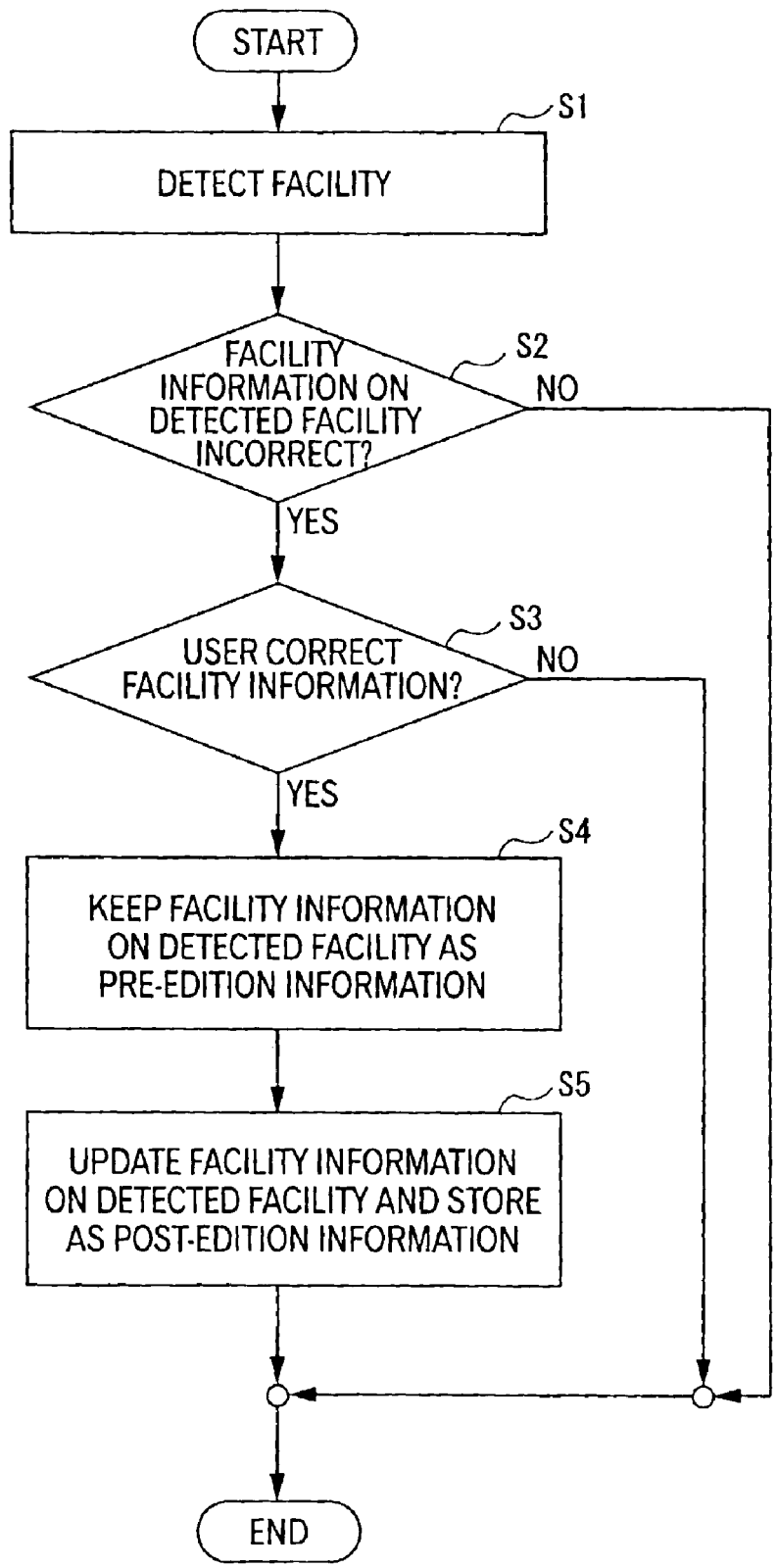
FIG. 5 is a flow chart of the operation of altering facility information of the embodiment of FIG. 1.
Figure 6:
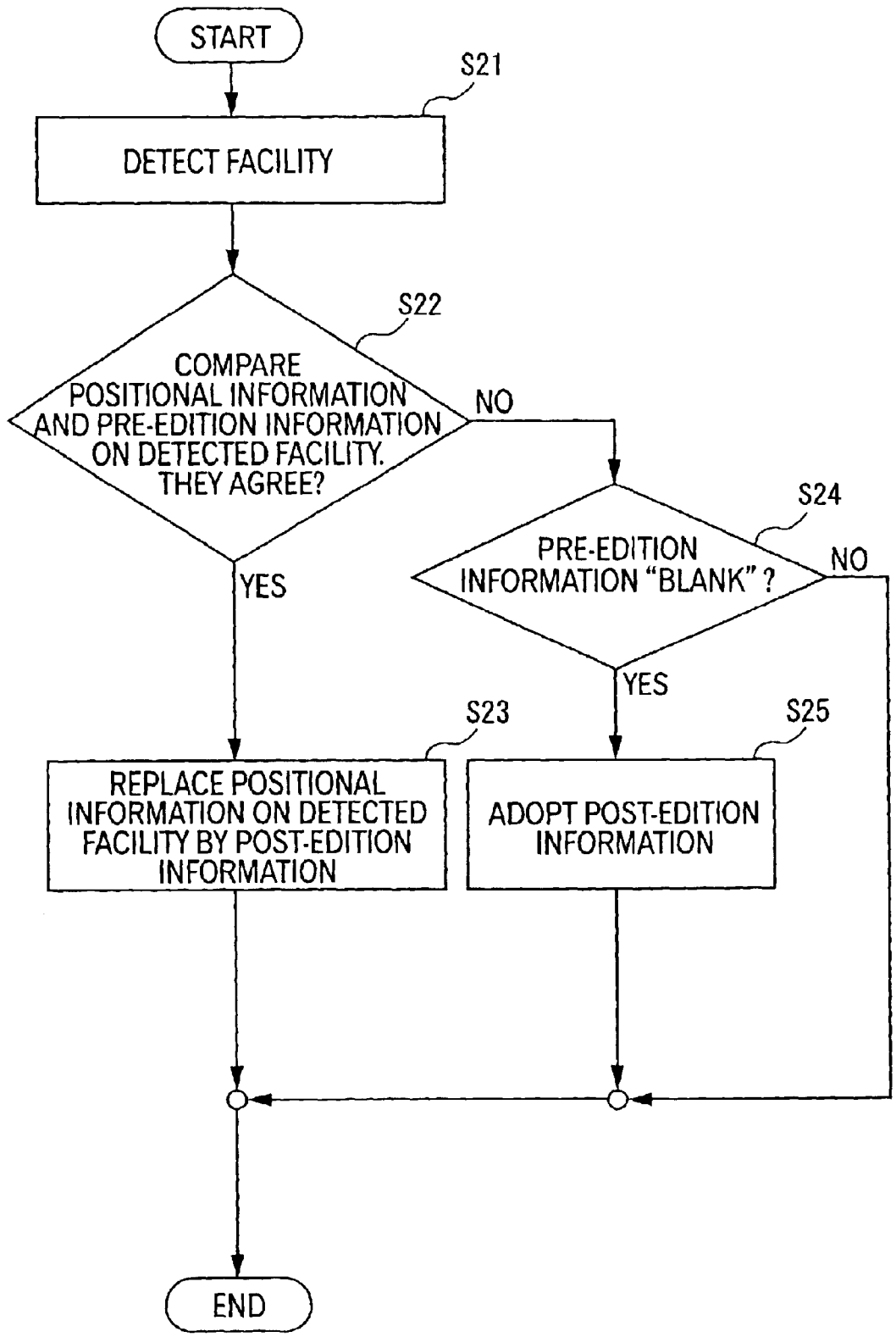
FIG. 6 is a flow chart of the operation of guiding/leading the driver by utilizing the altered facility information of the embodiment of FIG. 1.

Now, the operation of the navigation apparatus 1 will be described by referring to the flow charts in FIGS. 4 through 6. FIG. 4 is a flow chart of the operation of adding new facility information of the navigation apparatus. FIG. 5 is a flow chart of the operation of altering facility information. FIG. 6 is a flow chart of the operation of guiding/leading the driver by utilizing the altered facility information.

Firstly, the operation of adding new facility information to the facility information in the map information MP will be described by referring to the flow chart of FIG. 4.

As the power switch of the navigation apparatus 1 is turned on by the driver who gets into the vehicle, the navigation apparatus is supplied with power and starts operating. Then, the driver may input a new piece of facility information at the operation section 7 (Step S11). As a new piece of facility information is input in Step S11, the system control section 11 causes the facility information collating section 19 to store "blank" as pre-edition information n, which signifies that no data has been existing so far in the editing information storage section 10. In other words, the system control section 11 causes the facility information collating section 19 to store nothing as pre-edition information n but recognize what kind of pre-edition information n it is and store what it recognizes in the storage section (Step S12).

Then, the system control section 11 causes the display section 8 to display on the display screen thereof an image for prompting the user to input positional information on the location of a newly selected facility, the type of the facility, the icon to be used as identification and so on as updating information. As the user sequentially inputs data for the items displayed on the display screen of the display section 8 by way of the operation section 7 for the purpose of inputting updating information, the facility information collating section 19 stores the updating information in the editing information storage section 10 as post-edition information n (Step S13). The post-edition information n stored in Step S13 is the post-edition information n that is linked to the pre-edition information n in the storage section as "blank" in Step S12.

In this way, a piece of editing information n including a piece of pre-edition information n, which is "blank", and a piece of post-edition information n is newly formed as facility information to complete the operation of adding new facility information.

[Alteration of Facility Information]

Now, the operation of altering a piece of facility information in the map information MP will be described by referring to the flow chart of FIG. 5.

As the power switch of the navigation apparatus 1 is turned on by the driver who gets into the vehicle, the navigation apparatus is supplied with power and starts operating. Then, the driver may cause the navigation apparatus to detect a facility in the map information by means of the operation section 7 (Step S1). The system control section 11 operates to detect the facility on the basis of the map information MP and the above described editing information n and display the outcome of the detecting operation on the display section 8.

The information (at least either the positional information or the identifying information) on the detected facility that is displayed on the display section 8 as a result of detecting operation may not be correct because of some alteration. For example, the facility is a store and the store has been moved or closed and some other store may have been opened there. If the facility information described in the map information MP is no longer correct, the fact that the facility information is not correct is input at the operation section 7 (Step S2).

As the fact that the facility information is no longer correct is input in Step S2, the system control section 11 causes the display section 8 to display on the display screen thereof an image that asks the user if he or she wants to correct the facility information or not (Step S3). If the system control section 11 recognizes in Step S3 that the user operated the operation section 7 to input the fact that he or she does not want to alter the facility information, it terminates the operation of altering facility information in FIG. 5.

If, on the other hand, the system control section 11 recognizes in Step S3 that the user operated the operation section 7 to input the fact that he or she wants to alter the facility information, it causes the facility information collating section 19 to store the above described facility information as pre-edition information n in the editing information storage section 10 (Step S4). Thereafter, the system control section 11 causes the display section 8 to display on the display screen thereof an image for prompting the user to input updating information to alter the facility information.

As the facility information collating section 19 recognizes the fact that the user has input updating information to alter the facility information by means of the operation section 7, it stores the updating information for altering the facility information as post-edition information n in the editing information storage section 10 (Step S5). The post-edition information n that is stored in Step S5 is linked to the pre-edition information n stored in Step S4 to form a piece of editing information n. If the facility, which may be a store, does not exist any more, "blank" is input as post-edition information n. Thus, the operation of altering the facility information in the map information MP by using the facility information including positional information that is newly input by the user, which may be "blank" for deleting the facility information stored in the map information, is completed.

As a result of the alteration, the edited updating information can be used for various operations if the map information MP is stored in a CD-ROM or a DVD-ROM, to which no additional information can be written. That is, the updating information can be used for detecting a facility, or a destination of the route of movement.

Now, the operation of defining the route of movement of a navigation apparatus according to the invention and the operation of detecting a facility according to the guidance of the route will be described in greater detail.

As the power switch of the vehicle is turned on by the driver who rides on the driver seat or a passenger who rides on the assistant seat, the navigation apparatus 1 is powered to start operating. The driver causes the navigation apparatus 1 to define the route of movement by operating the operation section 7 to input necessary data. More specifically, the destination is specified by the driver who operates the operation section 7. Then, the driver specifies various route searching requirements such as selection of a route that provides the shortest moving time, a route that provides the shortest moving distance or a route that can avoid traffic jams and traffic restrictions in order to make the route of movement defining section 17 define the route of movement that satisfies the requirements.

To be more accurate, the current location recognizing section 15 recognizes the current location of the vehicle on the basis of GPS data, speed data, azimuth data and acceleration data. The destination recognizing section 16 recognizes the destination on the basis of the information on the destination specified by means of the operation section 7.

If the destination is the facility indicated by mark MK, which is the icon of the facility in the map information MP displayed on the display section 8, it is input at the operation section 7 by using the mark MK. If the destination is not shown in the map information MP, the user may detect a nearby electric appliance store or a gas station in the map information MP that the driver wants to select as temporary destination by retrieving information on the category of the store.

The operation of detecting the facility of destination in the map will be described by referring to the flow chart of FIG. 6. The user detects the facility by way of the operation section 7 (Step S21). Then, the system control section 11 detects the facility on the basis of the map information MP and the above described editing information n. The facility information collating section 19 of the system control section 11 retrieves the pre-edition information n of the editing information n that matches the detected facility. In other words, the facility information collating section 19 determines if the editing information n stored in the editing information storage section 10 contains a piece of pre-edition information n including positional information indicating the latitude and the longitude of the location of the detected facility (Step S22).

If it is determined in Step S22 that a piece of pre-edition information n including positional information exactly indicating the location of the detected facility is retrieved, the facility information collating section 19 replaces the piece of post-edition information n linked to the piece of pre-edition information n and displays the replacing piece of post-edition information on the display section 8 by the updating information (Step S23). Then, the facility information collating section 19 causes the destination recognizing section 16 to acquire the replacing piece of post-edition information n as destination information in response to a corresponding input at the operation section 7.

Then, the route of movement defining section 17 defines the route of movement from the current location as recognized by the current location recognizing section 15 to the location indicated by the replacing piece of post-edition information n. Then, the system control section 11 causes the guidance notifying section 18 to guide the driver to the facility described in the updated facility information on the basis of the defined route of movement.

If, on the other hand, it is determined in Step S22 that a piece of pre-edition information n including positional information exactly indicating the location of the detected facility is not retrieved, it is determined if there is a piece of editing information n that includes "blank" as pre-edition information n or not (Step S24). If it is determined in Step S24 that there is no piece of editing information n that includes "blank" as pre-edition information n, then the system control section 11 judges that no facility information has been altered and completes the operation of replacing the existing information by the updating information. In other words, it keeps on displaying the map on the display section 8 according to the map information MP stored in the map information storage section 6 that is not altered. Moreover, it causes the destination recognizing section 16 to acquire the map as destination information in response to a corresponding input at the operation section 7.

If, on the other hand, it is determined in Step S24 that there is a piece of editing information n that includes "blank" as pre-edition information n, then the system control section 11 judges that a new piece of facility information that is not found in the facility information in the map information MP is used for updating. More specifically, the facility information collating section 19 recognizes that a new piece of facility information is input as a result of an operation as shown in the flow chart of FIG. 4. Then, the facility information collating section 19 displays the post-edition information n of the detected editing information n on the display section 8 (Step S25) and acquires it as destination information by means of the destination recognizing section 16 in response to the input at the operation section 7.

Thus, the route of movement defining section 17 defines the route of movement from the current location recognized by the current location recognizing section 15 to the facility corresponding to the newly adopted post-edition information n. Then, the system control section 11 causes the guidance notifying section 18 to correctly guide the driver to the facility described in the newly input facility information on the basis of the defined route of movement.

Meanwhile, there may be cases where a facility, which may be a store, is selected as destination and the vehicle is driven to get to there but the facility is no longer there because it has been moved away and some other store is standing there. Then, the facility information may be altered or a new piece of facility information may be added by following the flow chart of FIG. 4 or FIG. 5, whichever appropriate. If such is the case, the facility information recognized by the destination recognizing section 16 is stored as pre-edition information n.

The updating information may be used not only for selecting a destination when defining the route of movement but also for detecting a store as described above and for causing the display section 8 to display the map information MP particularly in order to provide guidance on the basis of the defined route of movement. In other words, when there is a piece of facility information that is to be overlapped on the map information MP displayed on the display screen of the display section 8 and the facility information collating section 19 of the system control section 11 detects that a piece of updating information that is linked to a piece of facility information contained in the map information MP has been stored in the editing information storage section 10 as post-edition information n, the system control section 11 displays not the piece of facility information but the map information MP with the post-edition information n of the linked updating information overlapping the road information. If the piece of post-edition information n is "blank", the pre-edition information n linked to the post-edition information n is deleted because it is so judged that the facility, which may be a store, in the pre-edition information n does not exist any more and the existing facility information of the map information MP is not displayed.

Due to the function of altering facility information, when detecting facilities including those that may be stored and are standing as before or when displaying the map information MP for the purpose of selecting a destination in order to define the route of movement getting to a same facility or for the purpose of providing guidance to lead the vehicle along the route of movement, the facility information of the map information MP stored as a piece of pre-edition information n that is linked to a piece of post-edition information n may be replaced by a new piece of facility information including an updated piece of post-edition information n and displayed or may not be displayed at all.

Thus, with the above described embodiment, as the user inputs a piece of updating information including facility information that contains positional information on a facility, the facility information collating section 19 links the positional information contained in the input updating information to the facility information in the map information MP stored in the map information storage section 6 that contains positional information corresponding to the facility information in the updating information and stores it in the editing information storage section 10 as editing information n. Then, when the user utilizes the facility information in the map information MP for the purpose of driving the vehicle and if there is a change in a piece of facility information in the map information MP, he or she can appropriately replace it by using the editing information n and detect a facility or the route of movement by using the updated information.

Thus, according to the invention, a piece of editing information n is generated by linking a piece of facility information contained in a piece of updating information to the piece of facility information in the map information MP that has to be altered. Therefore, the altered information can be utilized without revising the map information MP. In other words, because facility information can be acquired with the map information MP on the basis of editing information n, if the map information MP is recorded on an unwritable recording medium such as CD-ROM or a DVD-ROM and there are changes that have taken place with regards to facilities such as stores so that the map information MP needs to be modified, updated facility information can be utilized as in the case of revising the map information MP. Therefore, it is no longer necessary to replace the unwritable recording medium storing the map information MP. Thus, the cost of updating the map information MP can be significantly reduced because the navigation apparatus 1 can be maintained for use at reduced cost. Additionally, it is possible to expand the scope of utilization of the navigation apparatus 1.

As pointed out above, the editing information storage section 10 stores pieces of editing information n, each of which is constituted by a pair of pieces of information including a piece of pre-edition information n that is facility information in the map information MP and a piece of post-edition information n that is updating information linked to the pre-edition information n. Then, pieces of editing information n including pairs of pieces of pre-edition information n and pieces of post-edition information n are stored in a table structure, where each pair of a piece of pre-edition information n and a piece of post-edition information n is stored as record. Therefore, altered facility information can be utilized without revising the map information MP by means of a simple arrangement of using a piece of updating information to replace a piece of pre-edition information linked to it.

Additionally, the editing information storage section 10 links a piece of positional information relating to the facility contained in the updating information to the facility information having a same positional information and contained in the map information MP and stores it as editing information n. Therefore, a piece of facility information contained in the map information MP and a piece of updating information having same positional information are linked to each other and the facility information to be altered is replaced by a piece of updating information on the basis of positional information. Thus, the altering operation and the operation of linking pieces of information can be performed in an easy manner so that the facility information in the map information MP can be altered in an efficient way.

Furthermore, the editing information storage section 10 can store "blank" that represents a no data condition indicating that the facility that corresponds either to a piece of facility information in the map information MP or to a piece of related updating information does not exist any more. Thus, it is possible to add a new piece of facility information that is not contained in the facility information in the map information MP or delete a piece of facility information from the map information MP when the facility described by the facility information in the map information MP does not exist any more so that the facility information in the map information MP can be altered to a large extent to raise the operational flexibility of the navigation apparatus 1.

When the user inputs a piece of facility information including positional information relating to a facility in order to detect the facility and/or select it as destination for the purpose of driving the vehicle and the navigation apparatus 1 has to read the input information, the facility information collating section 19 retrieves the editing information n and determines if the corresponding facility actually exists or not. If the facility does not exist any more, the facility information collating section 19 replaces the related piece of editing information n. Therefore, the user can utilize updating information to alter the facility information in the map information MP when detecting a facility and/or selecting it as destination so that he or she can appropriately define the route of movement and be guided appropriately for driving the vehicle to get to the destination.

[Modification to Embodiment]

The present invention is by no means limited to the above described embodiment, which may be modified in various different ways within the scope of the invention.

More specifically, while an arrangement to be installed on a vehicle to support the operation of providing guidance for driving the vehicle is described above, a navigation apparatus according to the invention can be installed on any other object that moves on a road other than a vehicle.

While map information including road information that utilizes links L and nodes N is described above, road information that can be used for the purpose of the invention may alternatively utilize nodes N and information on the directions of the roads extending from each of the nodes N as means for recognizing the characteristics of each road.

While a navigation apparatus installed on a vehicle is described above, a computer that reads and executes a program designed to perform the above described operations may be used so that facility information may be updated by the computer. Additionally, a recording medium storing the program may also be used. Furthermore, a navigation apparatus that is not installed on a vehicle may alternatively be used. For example, it is possible to use a communication type navigation apparatus whose system control section 11 is arranged at a server and adapted to transmit information to the terminal installed on the vehicle.

The map information storage section is not limited to an arrangement comprising a drive for reading information from an unwritable recording medium and a writable recording medium may alternatively be used for the purpose of the invention.

The moving condition recognizing section does not necessarily be so designed as to recognize the running condition of the vehicle on the basis of the signals from the sensor sections 3 through 5. It may be designed in a different way so long as it can recognize the moving condition of the vehicle.

The specific structure and the operational procedure of the above described embodiment may be modified appropriately without departing from the scope of the invention.

What is claimed is:

1. A navigation apparatus comprising:
    a map information storage section for storing map information including facility information containing positional information on facilities and identifying information for identifying each of the facilities,
    an input section for selecting and inputting updating information for updating the facility information in said map information;
    an editing information storage section for storing editing information linking said updating information to said facility information in said map information; and
    a facility information collating section for performing a control operation of causing said editing information storage section to store said updating information by recognizing said updating information as selected and input by said input section and causing said updating information to be read on the basis of said editing information by recognizing a request for reading the facility information in said map information.

2. The apparatus according to claim 1, wherein the editing information storage section stores editing information as pieces of information, each of which is constituted by a pair of pieces of information including a piece of post-edition information that is updating information and a piece of pre-edition information that is a piece of facility information to which the updating information is linked.

3. The apparatus according to claim 1, wherein the editing information storage section links a piece of positional information relating to the facility contained in the updating information to the facility information having a same positional information and contained in the map information and stores it as editing information.

4. The apparatus according to claim 1, wherein
    the editing information storage section can store a blank data that represents a no data condition indicating that the facility that corresponds either to a piece of facility information in the map information or to a piece of related updating information does not exist any more and the facility information collating section recognizes that a piece of facility information is added or deleted when a blank data is detected.

5. A method for updating the information relating to the facilities described in the map information to be utilized by a navigation apparatus for a moving vehicle, said method comprising:
    storing selected and input updating information for updating a piece of facility information including positional information relating to a facility and identifying information for identifying the facility contained in the map information upon recognizing the input of the updating information storing editing information linking said updating information to said piece of facility information, and
    acquiring said updating information on the basis of said stored editing information at the time of acquiring the piece of facility information in the map information.

6. The method according to claim 5, wherein
    said editing information is stored as pieces of information, each of which is constituted by a pair of pieces of information including a piece of post-edition information that is updating information and a piece of pre-edition information that is a piece of facility information to which the updating information is linked.

7. The method according to claim 5, wherein
    a piece of positional information relating to the facility contained in the updating information is linked to the facility information having a same positional information and contained in the map information and stored as said editing information.

8. The method according to claim 5, wherein
    a blank data that represents a no data condition indicating that the facility that corresponds either to a piece of facility information in the map information or to a piece of related updating information does not exist any more can be stored and that a piece of facility information is added or deleted is recognized when a blank data is detected.

9. A computer executable program for updating the facility information in said navigation apparatus adapted to cause a computational section to execute said method for updating the facility information in said navigation apparatus according to claim 5.

10. A recording medium storing a computer executable program for updating the facility information in said navigation apparatus according to claim 9 in such away that said computational section can read the program for updating the facility in formation of said navigation apparatus.

* * * * *